Jan. 30, 1923.

A. E. NORRIS.
LOADING MECHANISM
FILED OCT. 23, 1919.

Inventor:
Almon E. Norris,
by Emery, Booth, Janney Varney
Attys.

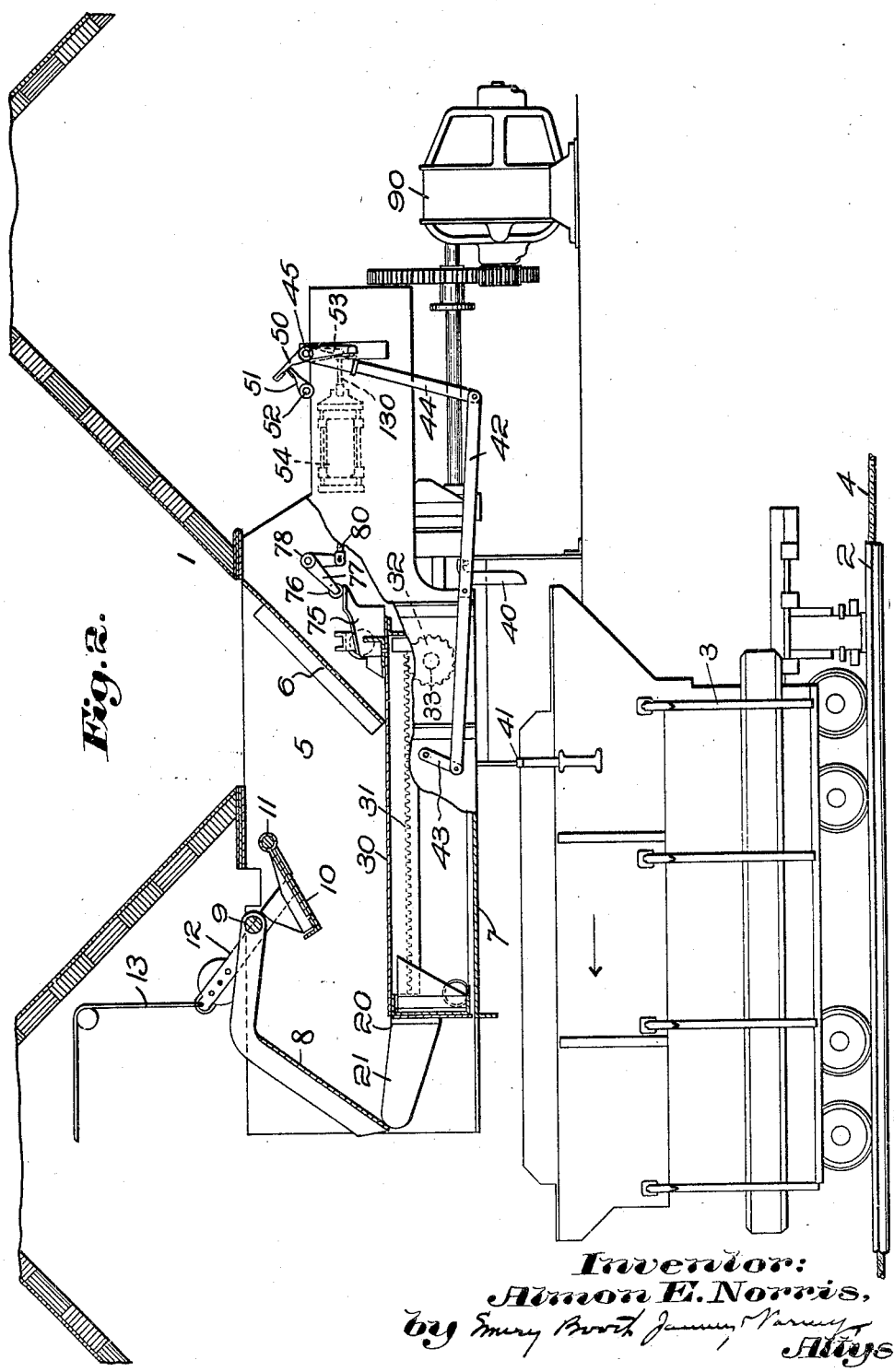

Jan. 30, 1923.
A. E. NORRIS.
LOADING MECHANISM.
FILED OCT. 23, 1919.
1,443,377
8 SHEETS-SHEET 3
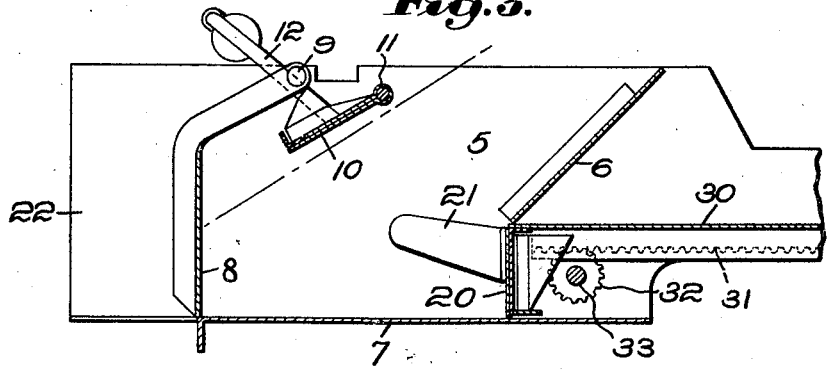
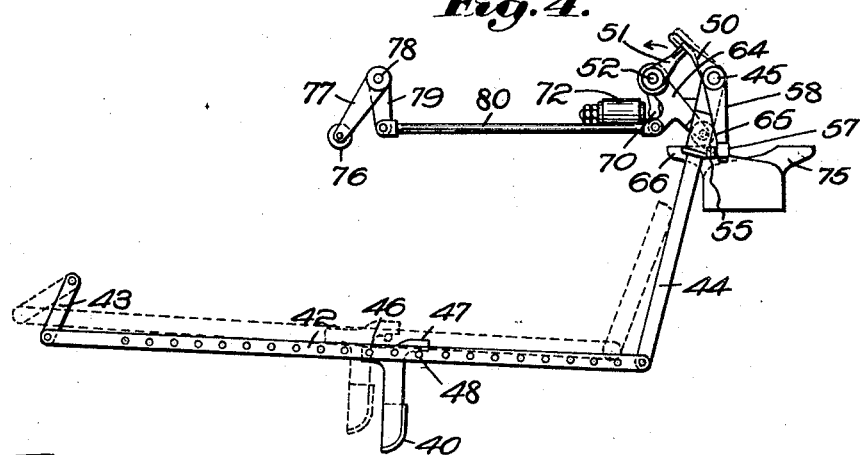
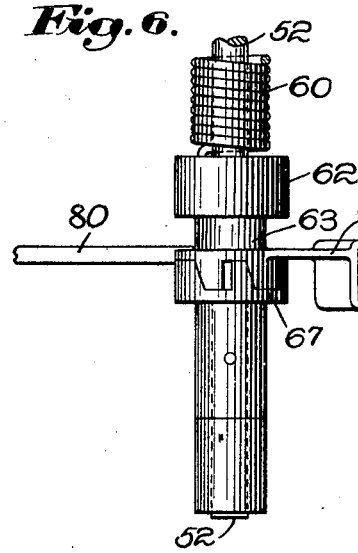
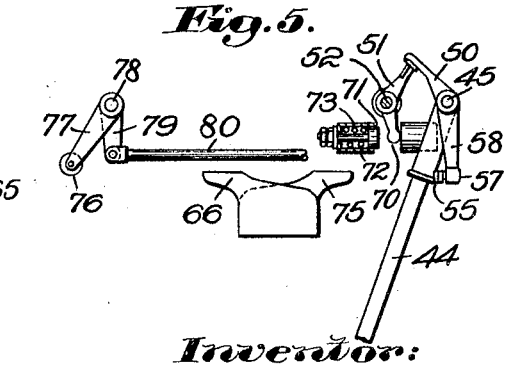

Jan. 30, 1923.
A. E. NORRIS.
LOADING MECHANISM.
FILED OCT. 23, 1919.
1,443,377
8 SHEETS-SHEET 4
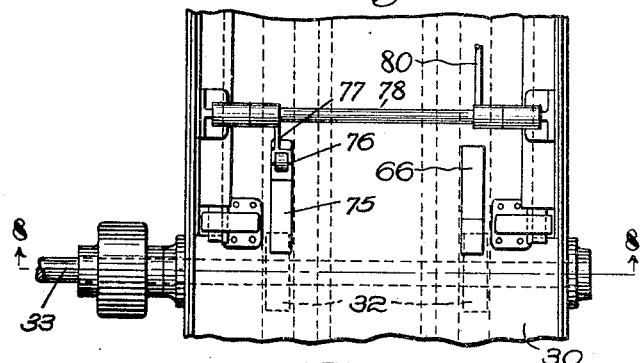
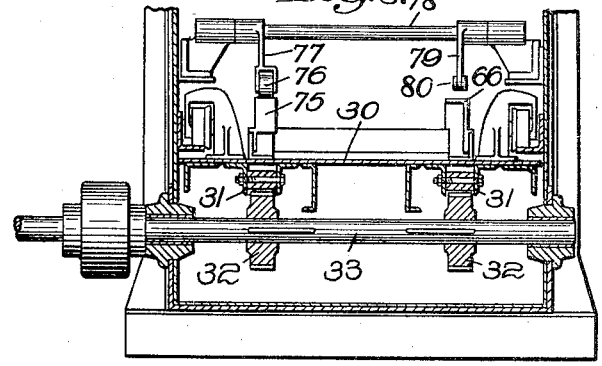
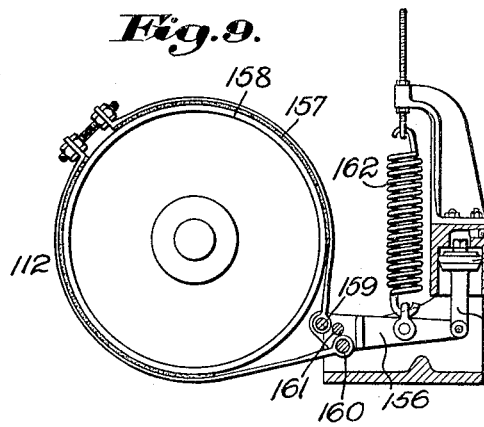
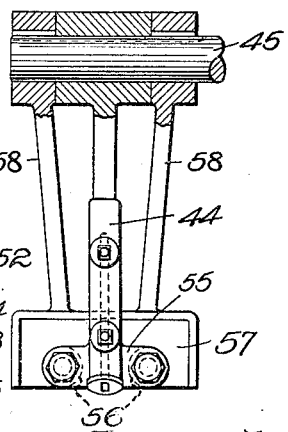
Inventor:
Almon E. Norris Jan. 30, 1923.
A. E. NORRIS.
LOADING MECHANISM.
FILED OCT. 23, 1919.
1,443,377
8 SHEETS-SHEET 5
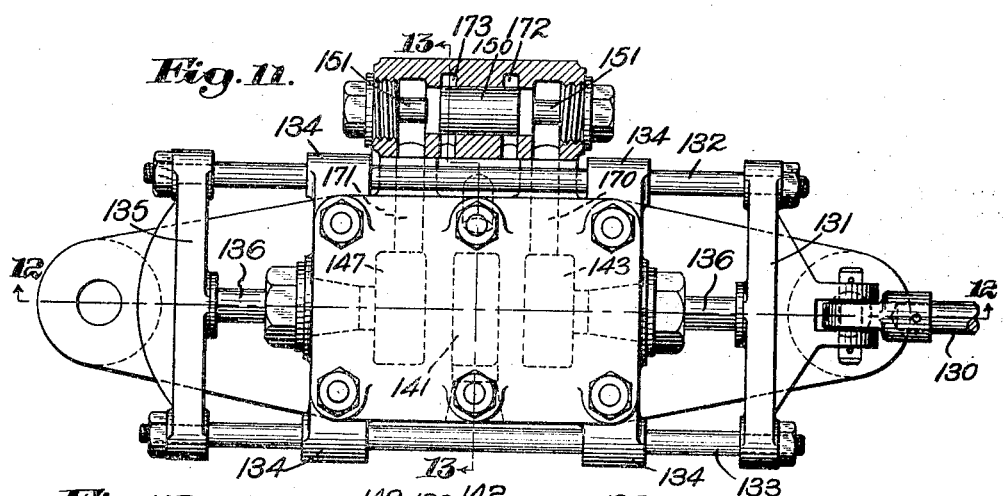
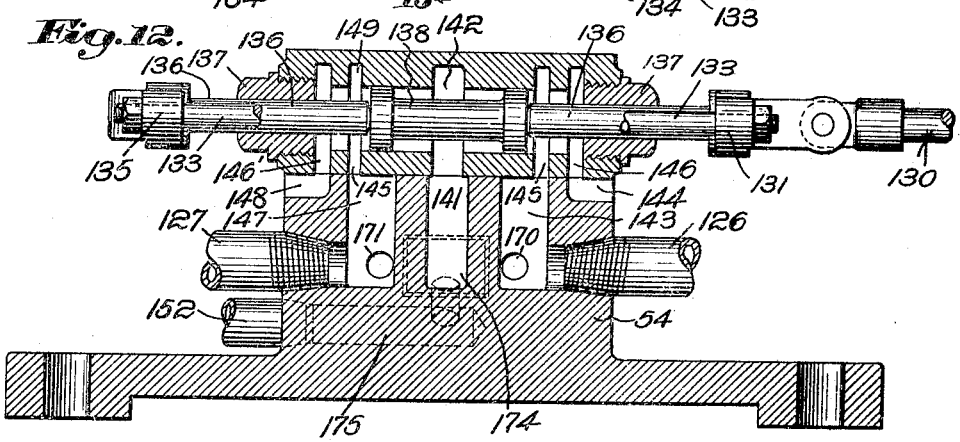
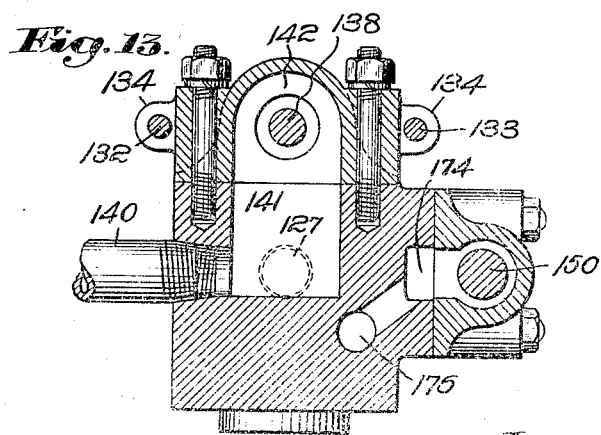
Inventor:
Almon E. Norris,

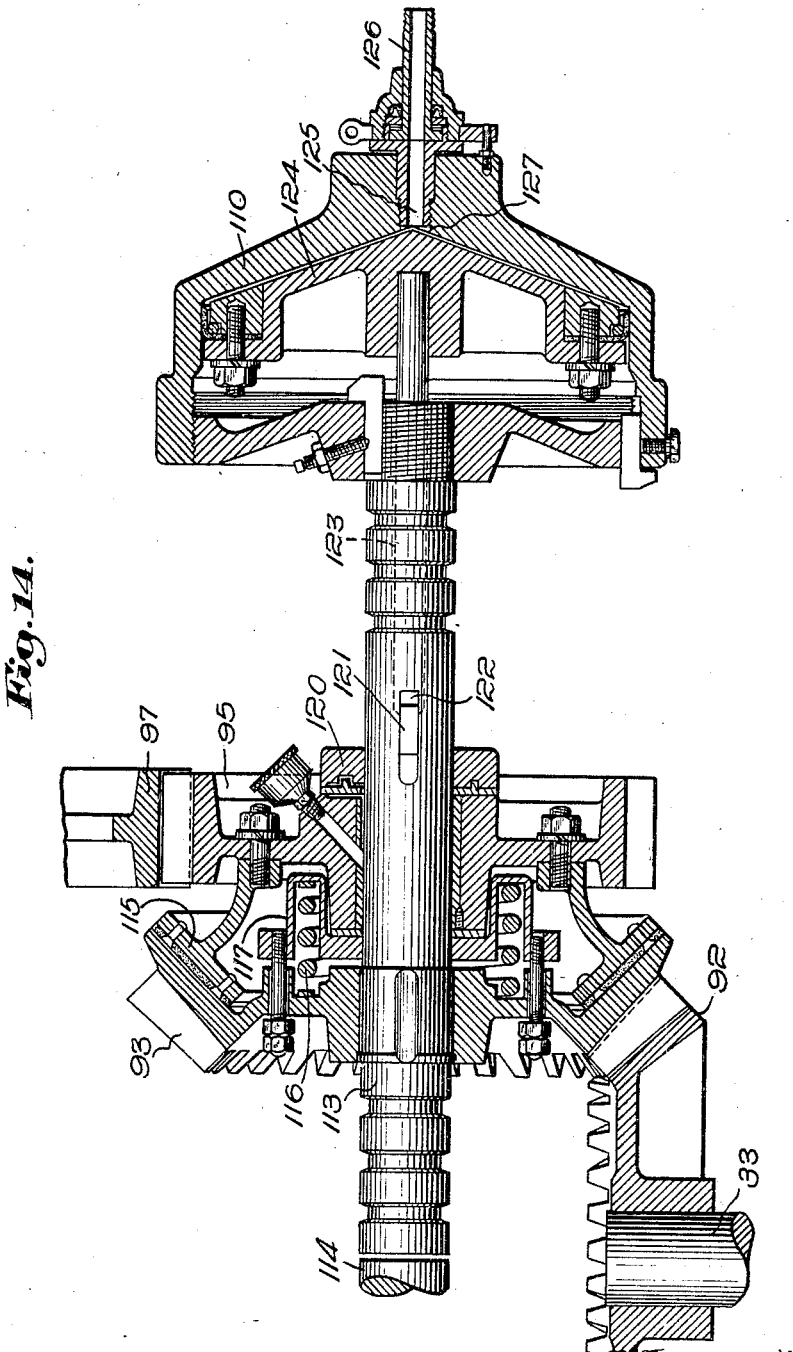

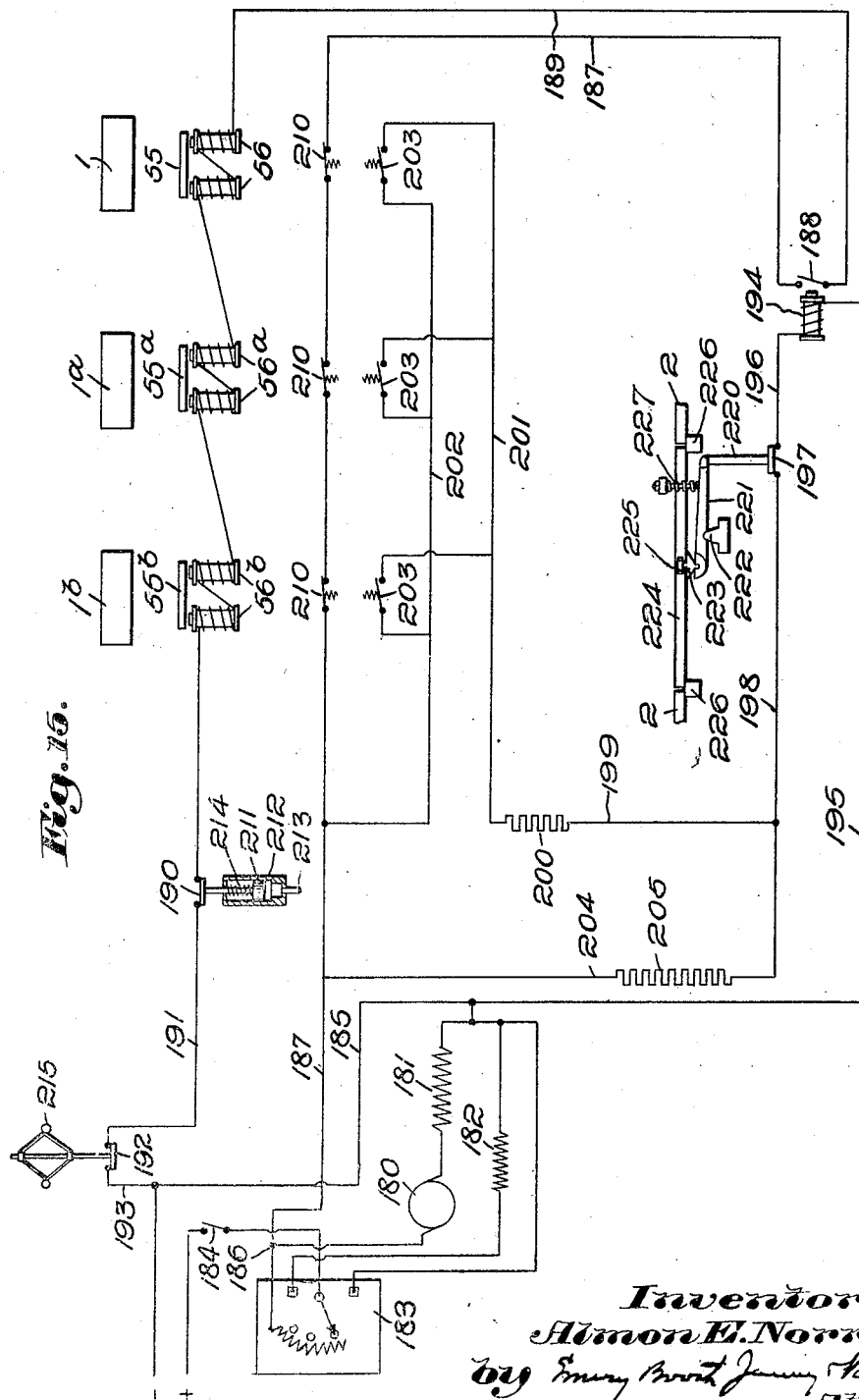

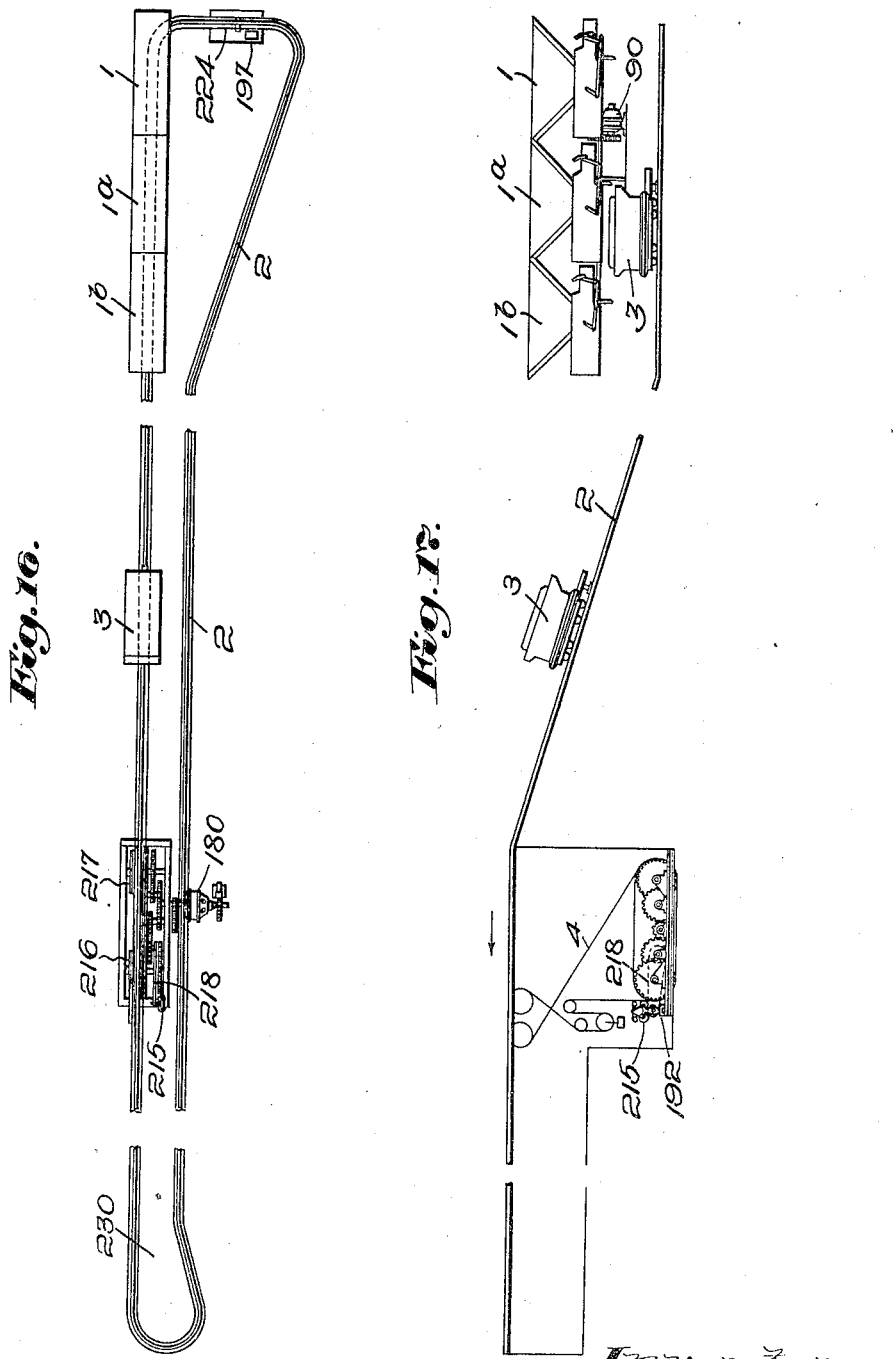

Patented Jan. 30, 1923.

1,443,377

UNITED STATES PATENT OFFICE.

ALMON E. NORRIS, OF BROOKLINE, MASSACHUSETTS.

LOADING MECHANISM.

Application filed October 23, 1919. Serial No. 332,696.

*To all whom it may concern:*

Be it known that I, ALMON E. NORRIS, a citizen of the United States, and a resident of Brookline, county of Norfolk, and State of Massachusetts, have invented an Improvement in Loading Mechanism, of which the following description, in connection with the accompanying drawings, is a specification, like characters on the drawings representing like parts.

This invention relates to loading mechanism, being more particularly intended to provide automatic means for loading coal or other material from a storage bin or other source of supply into conveying devices, such for example as travelling cars or other conveyors.

The invention will be best understood by reference to the following description when taken in connection with the accompanying illustration of one specific embodiment thereof, while its scope will be more particularly pointed out in the appended claims.

In the drawings:—

Fig. 2 is a side elevation in partial section showing some of the principal parts of the loading mechanism in the act of discharging a quantity of coal from the chute shown in Fig. 1 into the cable car beneath, which is adapted to travel on a suitable trackway;

Fig. 3 is a sectional elevation taken through the discharge chamber of the chute showing the discharging plunger in its normal or backward position;

Fig. 4 is a detail showing the trigger mechanism and controlling devices associated therewith for automatically starting into operation the movement of the discharge plunger, the parts being shown in their normal or latched position;

Fig. 5 shows parts of the trigger mechanism just after release;

Fig. 6 is a detail in plan showing the connection of the trigger shaft to its actuating lever;

Fig. 7 is a plan view of a portion of the reciprocatory bed or table and associated parts connected to the plunger;

Fig. 8 is a sectional elevation taken on the line 8—8 in Fig. 7;

Fig. 9 is a sectional detail in elevation showing the pressure-fluid-actuated brake;

Fig. 10 is a detail in elevation and partly in section showing the magnetic connection between the tripping linkage and the trigger lever;

Fig. 11 is a plan view of the air valve for controlling the power driving mechanism for the plunger, the brake valve being shown in section;

Fig. 12 is a sectional elevation taken on the line 12—12 of Fig. 11;

Fig. 13 is a cross-sectional elevation taken on the line 13—13 in Fig. 11;

Fig. 14 is a plan, partly in section, showing one end of the power driving mechanism with its pressure fluid controlled clutch;

Fig. 15 is a view which shows diagrammatically the relation of the electrical connections to the various controlling devices, and Fig. 16 is a plan view showing a typical installation embodying the loading mechanism herein described; and Fig. 17 is a view in elevation of the same installation.

Figure 1:
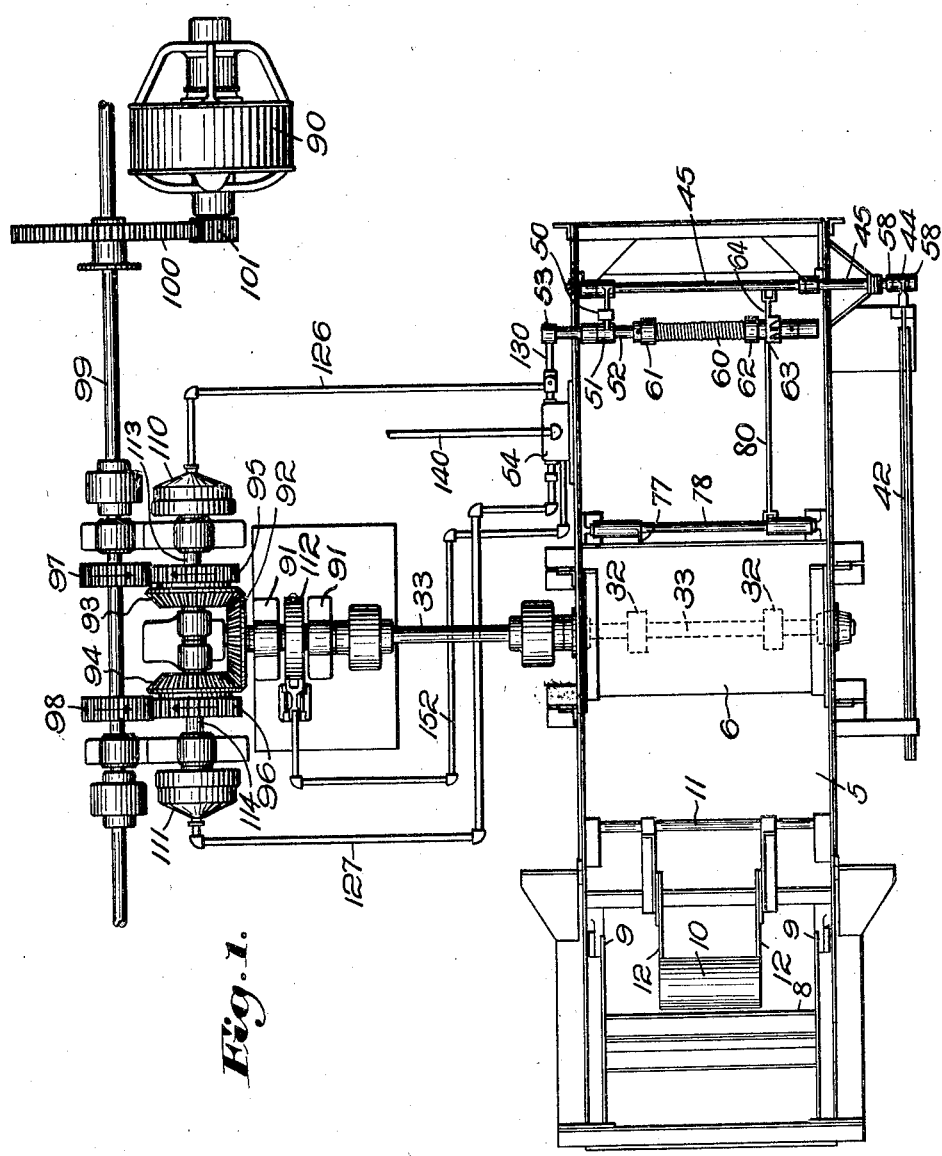
Figure 1 is a plan view showing one of a number of chutes or hoppers for a coal storage bin, and showing also the principal power-driven and controlling parts for automatically discharging coal therefrom to an underlying cable car or conveyor.

Referring to the drawings and to the specific embodiment of the invention which is submitted for illustrative purposes, there is shown a chute 1 which may be one of a series of chutes connected to a coal storage bin extending longitudinally over the trackway 2 and from which it is desired automatically to load cable cars or other travelling conveyors, one of which is shown at 3, while in transit beneath the bin. The cars may be of any suitable construction adapted to be propelled by the cable (Fig. 2) indicated at 4.

For simplicity, the parts which are associated with the chute for controlling the discharge of coal into the cable cars are shown with relation to a single chute only in Figs. 1 and 2, but a succession of such chutes may be employed and herein a plurality (three in number—1, 1ª and 1ᵇ) are indicated, measured diagrammatically in Fig. 15. It will be understood, however, that, as to general arrangement and principle of operation, the controlling parts may be substantially duplicated as to successive chutes, so that one only will be described in detail.

The object of the herein described form of apparatus is to load each cable car as it passes beneath the bin, preferably without interruption or slowing down of its movement, this being accomplished by a succession of accurately timed and quickly executed discharges from the successive chutes into each car as it travels beneath. Any desired number of chutes may be employed according to the capacity of the cars to be loaded and the capacity of the discharging apparatus associated with each chute.

Referring more particularly to Figs. 1, 2 and 3, each chute terminates at its lower end in a discharge chamber 5 having the deflecting wall 6 which forms an extension of one side of the chute, the bottom of the discharge chamber being closed by the plate 7. The end of the discharge chamber opposite the deflecting wall 6 is normally closed by the movable wall or gate 8 which is pivoted at 9 and which normally gravitates into the position shown in Fig. 3 where it rests against the edge of the bottom plate 7. As indicated in Fig. 3, the coal gravitates from the hopper into the discharge chamber, tending to assume somewhat the slope there indicated by broken lines, the slope and height of the coal with relation to the movement of the gate being controlled to some extent by the swinging deflecting plate 10 which is pivoted at 11 and has the weighted arms 12 adapted to cause it to bear against the gravitating coal pile. If desired, the plate may have means, such as the cable connection indicated conventionally at 13 in Fig. 2, by which it may be adjustably raised or lowered. This permits the plate to be suspended in some such position as shown, from which position it may yieldably lift under the pressure of the coal.

When it is required to discharge the coal accumulated in the lower part of the discharge chamber, a reciprocatory movable wall or plunger 20 is caused to advance across the bottom of the discharge chamber from the position shown in Fig. 3 to the position shown in Fig. 2, carrying with it a forwardly projecting arm 21 which is secured to the side of the movable plunger. The plunger pushes the accumulated coal towards the edge of the bottom plate 7, the pressure of the coal supplemented by the arm 21, lifting the movable gate 8 into the position shown in Fig. 2 where it permits the free discharge of the coal over the edge of the bottom plate 7. The sides 22 of the discharge chamber are extended beyond the edge of the bottom plate so that the discharged coal is guided to drop directly into the path of the underlying cable car and the action of the plunger is accurately timed, as will more fully appear, to take place while the coal-receiving portion of the cable car is passing directly beneath the path of the discharged coal.

As soon as the plunger reaches the end of its movement, indicated in Fig. 2, it is automatically and instantly returned to its initial and normal position by devices which will be hereinafter described. The proportions of the discharge chamber and plunger may be such that the movement of the plunger will discharge a substantially predetermined amount of coal, so that as the car passes the successive chutes it automatically receives from each a predetermined amount, as for example, one ton or half a ton, or more or less, as the case may be, sufficient to complete the load of the car as it passes the last chute in the bin.

The movable wall or plunger 20 is carried at the front end of a reciprocatory table or bed 30 carrying one or more racks 31 (see Figs. 2 and 8) meshing with pinions 32 on the power shaft 33, by which movement is imparted to the table. An accurately timed movement is given the power shaft 33 to impart a quick forward-and-back movement to the table 30 at the appropriate time by suitable controlling devices. Such movement must be very rapid in order to discharge the coal while the car is passing beneath the discharge end of the discharge chamber, while at the same time permitting the car to maintain a suitable speed of travel, and such movement must also be accurately timed with reference to the position of the car. The control of the power shaft is herein effected by pressure fluid actuated devices under the control of a suitable valve, the latter being operated by a trigger mechanism actuated by tripping devices directly controlled by the car itself.

Referring now to the tripping mechanism and more particularly to Figs. 1, 2 and 4, at the side of each discharge chamber there is provided a depending tripping arm 40 which lies within the path of a laterally extending knock-off arm 41 (Fig. 2) carried by the cable car, so as to be struck by the knock-off arm as the car travels in the direction of the arrow shown in Fig. 2. This takes place just as the load-carrying part of the car reaches a coal-receiving position. The tripping arm 40 is carried by a link member 42 jointed at one end to the lever 43, which latter is pivoted to the side of the discharge member, and jointed at the other end to a depending arm 44, the upper end of which is fulcrumed on the end of a latch shaft 45. The tripping arm presents a rounded or bevelled face to the knock-off arm, so that, when engaged by the latter, the tripping arm rides upon the knock-off arm and is lifted thereby, also lifting the link 42 and moving the tripping linkage from the full line position shown in Fig. 4 to the dotted line position therein shown.

The tripping lever 40 is pivoted at 46 between two strips which form the link 42, its pivotal position being preferably adjustable lengthwise the link so it may be located in the exact spot which is required accurately to coordinate the movement of the discharge plunger with the travel of the cable car at the particular speed at which the cable road is operated. The tripping lever has a lug or finger 47 (Fig. 4) which rests upon a pin 48 secured to the link 42, the construction being such that the tripping lever is substantially rigid with relation to the link 42 when engaged by the knock-off arm in the normal movement of the cable car in the direction of the arrow shown in Fig. 2, and under such circumstances causes the lifting of the linkage. If engaged by the knock-off arm 41, however, on any opposite movement of the car, either designed or accidental, the tripping lever 40 swings about its pivot 46, allowing the knock-off arm to pass beneath the same without moving the link.

Referring now to the tripping mechanism, the movement of the tripping linkage which results from the passage of a car beneath the chute serves to lift a latch 50 (Figs. 1, 2, 4 and 5) secured to the latch shaft 45 and release a trigger 51 carried by the trigger shaft 52, the resulting movement of the trigger 51 serving to move a depending lever arm 53 (see Figs. 1 and 2) on the end of the trigger shaft and actuate a controlling valve mounted in the valve casing 54 at the side of the discharge chamber, which in turn instantly applies power to move the discharge plunger 20.

To provide a means whereby the loader may be rendered ineffective at any required time in order to meet abnormal conditions, such for example as loss of power on the cable road or the passage of a partly loaded car or other conditions as will be more fully explained, the link 44 is operatively connected to the latch shaft 45 by a magnet connection which may be broken as required by means of suitable controlling devices, as will be hereinafter explained. For this purpose the link 44 is mounted to turn loosely on the shaft (see Figs. 5 and 10) but carries an armature 55 which cooperates with the pole pieces of a pair of magnets 56, the magnets being mounted in the magnet carrier 57 supported by the arms 58, which latter are keyed or otherwise fastened to the latch shaft 45 at the opposite sides of the arm 44. The windings of the magnets 56 are included in a controlling circuit hereinafter described and are normally energized so that the magnet carrier 57 is attracted to the armature 55 and the arms 58 and latch shaft 45 are thereby operatively connected to the arm 44 and move therewith. When the magnet circuit is opened, however, and the magnets deenergized, the movement of the linkage may take place without any movement of the arms 58 or the latch shaft 45.

The latch shaft 45, which is mounted to turn in the structure connected to the delivery chamber, carries at its opposite end the latch 50, a shouldered end of which normally overlies the end of the trigger 51 and holds it in the position shown in Fig. 4. In the normal position of the apparatus, the trigger is urged or pressed in the direction of the arrow shown in Fig. 4 and against the shouldered end of the latch by means of a helical spring 60 encircling the shaft 52, one end of which spring is secured to a collar 61 (Fig. 1) keyed to the trigger shaft 52 and the opposite end of which is secured within a sleeve 62 carried by a clutch 63 (Fig. 6). The clutch 63 has a depending lever arm 64 carrying the cam roll 65 lying within the path of a cam 66, which cam (see Fig. 7) is mounted on the reciprocatory bed 30. The clutch 63 has teeth which register and cooperate with similar teeth carried by a clutch sleeve 67 fixedly secured on the shaft 52, there being provided, however, considerable lost motion or clearance between the teeth in the respective clutch members 63 and 67.

When the plunger and table move back to the normal position (shown in Figs. 3 and 4), after the discharge of coal, the cam 66 engages the cam roll 65 and the latter, riding upon the face of the cam, is left in the position shown in Fig. 4 when the parts come to rest, having moved the clutch arm 64 counterclockwise. This movement of the arm 64 first brings the trigger into contact with the latch through the stiff spring connection 60 and then, through a slight continuation of the movement, acts to wind up or tension the spring. The necessary movement of the clutch lever after the trigger has been brought to rest by the latch is permitted by the lost motion in the clutch teeth, the teeth on the clutch member 63 advancing to bring their bevelled edges in contact with the bevelled edges of the clutch member 67 and the straight edges being separated when the parts come to rest by the amount of lost motion, as indicated in Fig. 6.

It follows, therefore, that as soon as the linkage moves to lift the latch 50, the trigger, under the tension of the spring 60, instantly snaps from the position shown in Fig. 4 to that shown in Fig. 5, the spring 60 relaxing under this movement and bringing the straight edges of the teeth on the two jaw members again into contact.

To check the momentum of the trigger when released and to prevent any excess movement in either direction, the trigger has a depending arm 70 which works between two spring-pressed buffers 71 (Fig. 5), each consisting of a plunger movable within a casing 72 and having the spring 73 which yieldably holds the plunger in a predetermined position with relation to the arm 70.

When the trigger 51 moves from the normal position shown in Fig. 4 to its released position shown in Fig. 5 it causes the valve-actuating lever 53 at the end of the trigger shaft to swing counterclockwise through a sufficient arc to move the valve instantly to its starting position.

The valve instantly starts in motion the drive shaft 33, starting the plunger on the table in its forward, coal-discharging movement. This withdraws the cam 66 from beneath the cam roll 65, leaving the clutch lever 64 and the trigger free to move back (or in a clockwise direction as viewed in Figs. 4 and 5); but until positively reversed, the trigger and trigger shaft remain in the position shown in Fig. 5 due to the friction of the parts. As the plunger and table approach the forward limit of movement (see Fig. 2), a second cam 75 also carried by the table or bed 30 engages a cam roll 76 carried by the lever arm 77 mounted on the transverse rock shaft 78, the latter being connected to the clutch lever 64 by the depending lever arm 79 and the link 80.

The table with the cam, which has moved at the end of the coal-discharging movement from the position shown in Fig. 3 to that shown in Fig. 2, thereupon moves the cam roll 76 and thereby swings the clutch lever 64 and trigger 51 to the position shown in Fig. 2, this serving to swing the valve-operating lever 53 back through an arc sufficiently beyond its normal position to reverse the valve, as will be more fully described, and to reverse the movement of the driving shaft 33. This immediately starts the plunger in its backward movement, moving the parts from the position shown in Fig. 2 to the latched or normal position shown in Fig. 4.

When the passage of a cable car moves the linkage to release the trigger, and the knock-off arm 41 has passed the trip arm 40, the linkage drops back to its normal position, allowing the latch lever 50 to drop down into the position shown in Fig. 5. As soon as the trigger is thrown back into the position shown in Fig. 2, following the completion of the forward movement of the plunger, the latch lever falls in front of the trigger, as shown in Fig. 2, and is in a position to stop and hold the trigger as soon as the plunger completes its rearward movement and the spring 60 is placed under tension as already described.

The parts, having completed their cycle of movement, are thus restored to their normal position and are ready to perform another discharging operation as soon as the trip lever 40 is engaged by the knock-off lever on the succeeding cable car.

Referring now to the driving mechanism for the discharge plunger, a constantly driven, power-actuated member is preferably provided, the same being herein driven by some prime mover such as the electric motor 90, which power-driven member, through suitable reversing gearing and under the control of the valve device 54, is adapted to be connected to the drive shaft 33 to turn the same first in one direction and then in the other according to the movements of the trigger 51. Through the provision of the constantly driven prime mover, power may be directly and instantly applied to the plunger to effect its movement quickly and instantly and without the delay which is incidental to the action of discharging devices acting in response to gravity or where prime movers are employed which must be started into operation and brought up to speed before full power is available for moving the discharging agency.

While the application of power to the drive shaft 33 to turn the same first in one direction and then in the other may be had by any suitable means, herein the shaft 33 is mounted in bearings 91 (Fig. 1) and carries at its end the bevelled gear 92 which meshes with the two gears 93 and 94. The bevelled gears 93 and 94 are mounted adjacent spur gears 95 and 96 respectively but are normally disconnected therefrom. The gears 95 and 96 are constantly driven in the direction of the arrow shown in Fig. 1 by engagement with the driving pinions 97 and 98 respectively, the latter being keyed or otherwise fixedly secured on the driving shaft 99 which is driven from the motor 90 by the intermeshing gears 100 and 101. The driving shaft 99 may be extended, as indicated in the drawings, to transmit power to the driving mechanism for the other loaders of the series through similar transmission devices.

It will be obvious that if the gear 93 is clutched to the gear 95, the gear 92 and the drive shaft 33 will be immediately turned in the direction suitable for moving the plunger and table forward. On the other hand, if the gear 94 is clutched to the gear 96, the driving shaft will be turned in the opposite direction, tending to return the plunger and table to its normal position.

Any suitable clutching devices may be employed, but herein pressure-fluid, clutch-operating devices 110 and 111, under the control of the valve 54, are utilized for this purpose, the joint action of the valve and the pressure fluid clutches insuring an instantaneous response on the part of the driving shaft to the movement of the trigger. In order to check the movement of the table and plunger at the end of its stroke, there is also preferably employed a brake 112 actuated by fluid pressure under the control of the valve, as hereinafter more fully described.

Referring to the power transmission and reversing mechanism and particularly to Figs. 1 and 14, the operating driving mechanism for the two gears 93 and 94 is substantially the same and need only be described as to one gear. Referring to operating mechanism for the gear 93 (Fig. 14), the gear is keyed or otherwise secured to the shaft 113 which is separate from the corresponding shaft 114 for the gear 94. The driving gear 95 is mounted to turn loosely about the shaft 113 but carries a cone-shaped clutch member 115 which is adapted to be moved lengthwise the shaft to engage with a cooperating friction clutch surface carried by the gear 93. The clutch surfaces are normally kept out of contact and the clutches disengaged by the spring 116 one end of which is seated in a sleeve 117 bearing against the hub of the gear 95 and the other end of which is seated in a groove in the face of the gear 93. To force the clutch members into clutching engagement, the opposite end of the hub on the gear 95 is engaged by a thrust collar 120 against which bears a thrust pin 121 working in a slot 122 in the shaft 113, the thrust pin being connected to a thrust rod 123 extending axially through the shaft to its outer end where it is connected to the plunger or piston 124 of the pressure-fluid operating member 110. The piston 124 is movable within a cylinder-like chamber formed in the casing of the clutch operating device 110 and its face is exposed to pressure fluid admitted through an admission passage 125 which has connection with the pressure fluid supply pipe 126, the connection being such as to permit the rotation of the pressure-fluid clutch operating device 110 with the shaft 113 in relation to the pipe 126.

The pressure fluid supply pipe 126 for the clutch-operating device 110 leads to one side of the valve casing 54 and the pressure fluid supply pipe 127 for the other clutch-operating device 111 leads to the opposite end of the valve casing. The arrangement is such that when the pipe 126 is open to the pressure fluid supply, the piston 124 is moved longitudinally, clutching the gear 95 to the gear 93 and starting the shaft 33 into motion in one direction. When the supply pipe 126 is opened to the exhaust, the clutch is disengaged through the spring 116 and further movement of the shaft 33 ceases, this being preferably supplemented by the simultaneous application of the brake 112 under pressure fluid control. When the pressure fluid is admitted to the pipe 127, the gear 96 is clutched to the gear 94 and the shaft 33 starts turning in the opposite direction, this motion ceasing as soon as the pipe 127 is connected to the exhaust.

Referring now to the controlling valve, the casing 54 for the latter is mounted on the side of the delivery chamber structure and the valve has connection to the valve-operating lever by means of the link 130, the latter at its opposite end being jointed (Figs. 11 and 12) to a yoke 131. The yoke 131 is connected to the slide rods 132 and 133 which are mounted for sliding movement in lugs 134 on the valve casing, the slide rods being united at the opposite end of the cross bar 135. The yoke, cross bar and slide rods constitute a sliding frame which carries at opposite ends the plunger pins 136 which pass through the packing glands 137 at opposite ends of the valve casing and contact with the opposite ends of the main or clutch-controlling valve 138. The latter is of the spool type having enlarged heads at opposite ends and a reduced intermediate portion, the latter being exposed to live pressure fluid which enters the casing through the inlet pipe 140 (Fig. 13), the admission space 141, and the port 142. The supply pipe 126 for the clutch device 110 is connected to a space 143 which is normally connected with an exhaust opening 144 through the open ports 145 and 146. Similarly, at the opposite end of the valve casing, the pipe 127 is connected to the space 147 which is normally open to an exhaust passage 148 through the open ports 149 and 146'.

When the trigger 51 is released and moves counter-clockwise as viewed in Fig. 4, the plunger pins 136 are moved to the right as viewed in Fig. 12, this moving the valve 138 so as to close the port 145 to the exhaust passage 144 and open it to the port 142 and the admission space 141. This instantly opens the supply pipe 126 to live pressure fluid and actuates the clutch-operating device 110.

When the trigger lever is moved back from the position shown in Fig. 5 to that shown in Fig. 2 by the completion of the forward movement of the plunger, the plunger pins 136 move to their opposite extreme position, this in turn moving the valve 138 to open the space 143 and likewise the pipe 126 to the exhaust space 144, thereby releasing the clutch-operating device 110. At the same time, the space 147 and likewise the pipe 127 is opened to live pressure fluid through the admission space 141 and closed to the exhaust space 148, thereby applying the clutch for the gear 94 and reversing movement of the driving shaft.

When the plunger completes its rearward movement and brings the controlling parts to the position shown in Fig. 4, the valve is restored to its normal or mid position, represented in Fig. 12, wherein both supply pipes 126 and 127 are open to the exhaust and both clutches disengaged.

Simultaneously with the admission of pressure to either supply pipe 126 or 127, pressure is admitted to release the brake 112, the latter being instantly applied as soon as the valve is brought to its mid position and pressure fluid exhausted from both clutch-operating devices. For this purpose a second valve 150 for controlling the brake is also mounted in a separate chamber in the valve casing, such valve having a limited movement between the opposite abutments 151. This valve controls the admission of pressure fluid through a pipe 152 (Figs. 1 and 12) to a brake-operating cylinder 153 (see Fig. 9), the latter containing a piston 154 connected by the piston rod 155 to the brake-operating lever 156. The brake may be of any suitable form but is herein shown as a brake band 157 encircling a suitable brake drum 158 and having its opposite ends connected to the brake lever 156, one at the point 159 and the other at 160, the connections being such that when the lever is moved about the fulcrum 161, it applies or releases the brake band, as the case may be. Normally the brake is applied by a heavy spring 162 connected to the brake lever 156 so that in the absence of pressure fluid admitted through the pipe 152, the brake is applied. When the pressure fluid is admitted through the inlet pipe 152, the piston 154 moves down and the lever 156 is depressed against the tension of the spring and the brake released.

Referring to the brake-controlling valve (Fig. 11), the opposite ends of the valve chamber therefor are connected by suitable ports 170 and 171 with the spaces 143 and 147 and the pipes 126 and 127 respectively. When fluid pressure is admitted to the pipe 126, for example, it also passes through the port 170 and moves the brake valve 150, to the left as viewed in Fig. 11, this uncovering the port 172 and admitting pressure fluid thereto from the port 170. On the other hand, when pressure fluid is admitted to the pipe 127, the valve 150 is moved in the opposite direction, uncovering a port 173 and admitting pressure fluid thereto from the space 147 and port 171. Ports 172 and 173 both open into a space 174 (Fig. 13) which in turn is connected to a passage 175 communicating with the brake supply pipe 152 (Fig. 12).

On the movement of the main clutch-operating valve, therefore, in either direction for the actuation of either clutch, the brake valve is moved in one direction or the other, this serving to admit pressure fluid to the brake cylinder and immediately release the brake. On the release of both clutches, however, the brake is instantly applied.

In the operation of a system like that described, it is often desirable to provide certain controlling devices to prevent or modify the operation of the loader in the case of abnormal conditions. In Fig. 15 I have shown diagrammatically an arrangement of controlling circuits whereby such control may be effected through the magnetic connections 56 which have been already described as constituting part of the operative connection between the tripping lever and the latch shaft.

Referring to Fig. 15, the cable drive motor 180, with its series field 181 and shunt field 182, is connected to the positive side of the power circuit through the starting rheostat 183 and the main switch 184, and to the negative side of the power circuit through the conductor 185. The magnet windings 56, 56$^a$, 56$^b$, etc., for the successive coal chutes 1, 1$^a$, 1$^b$, etc., are included in series in a shunt circuit which starts from the positive terminal 186 and extends through the conductor 187 to the magnetically actuated switch 188, thence through the conductor 189 to each set of magnet coils in succession, thence through the switch 190 and conductor 191 to the switch 192, and thence through the conductor 193 to the negative side of the power circuit.

The switch 188 is adapted to be moved to a closed position by the magnet coil 194 contained within a shunt circuit, which latter extends from the conductor 185 through the conductor 195, thence through the magnet 194, conductor 196, switch 197, conductors 198 and 199, resistance 200, conductors 201 and 202, the latter connected to the conductor 187.

The conductors 201 and 202 are adapted to be connected at one or more points by normally open switches 203, as for example by a series of push buttons arranged one at or near each loading chute, so that by pressing the push button and closing the circuit at any one loading device after the cable motor has been started, a current may be caused to flow through the described shunt circuit and energize the magnet 194, closing the switch 188 and energizing the magnet coils 56, 56$^a$ and 56$^b$. When any given switch 203 is released, it will again open the circuit, but the switch 188 will remain closed by a current which continues to flow through the magnet 194 from the conductor 204, which latter connects the conductor 187 with the conductor 198. The conductor 204 contains a resistance 205 which permits the flow of a sufficient current to hold the switch 188 closed but insufficient to effect its closure when open. The conductor 199, on the other hand, contains a lesser resistance 200 suitable to permit a current flow sufficient to effect the closure of the switch 188 when a push button is pressed.

Included in the circuit 187 there are preferably provided one or more normally closed switches 210, as for example, normally closed push button switches, and which may be located one at or in the vicinity of each coal chute, by means of which the operative can at any time open the circuit for the magnets 56, 56ª and 56ᵇ and render the loading devices ineffective. There is thus provided means to throw the loaders out of operation when any abnormal conditions arise which make their operation undesirable.

In order to provide means for the opening of a magnet circuit in the event the fluid pressure in the supply pipe falls below the amount required for the effective operation of the controlling devices for the power transmission or below any predetermined amount, means such as the switch 190 may be provided which is normally held closed by means of the piston 211 contained within the cylinder 212 and exposed to pressure fluid through the pipe 213, the latter connected to the main supply pipe 140 for the valve casing 54. The pressure fluid within the cylinder 212 lifts the piston against the pressure of a spring 214 but, if the pressure falls below a predetermined amount, such spring depresses the piston and opens the circuit at the switch 190.

There may also be provided means for opening the magnet circuit in the event that the speed of the cable motor drops below a predetermined amount. For this purpose there is connected to the cable motor or to suitable devices driven thereby, a speed responsive device such as a ball governor 215, the latter connected to hold the switch 192 in circuit-closing position so long as the speed of the cable motor and the speed of the cable are maintained above the required point, but adapted to lower the switch and open the circuit when the speed falls below such point.

Any suitable operative connection may be maintained between the governor 215 and the cable motor. Herein (Figs. 16 and 17) at some appropriate point in the trackway, the cable 4 is diverted to pass over suitable winding drums 216, 217, the latter being driven through a suitable gearing from the motor 180, and the governor 215 having a driving connection, as through the belt 218, from one of the intermediate transmission shafts so as to be maintained at a speed proportionate to that of the motor and the cable.

In the operation of a system of this type, it sometimes happens that a car already loaded or partly loaded will pass beneath the coal chutes and, if unobserved, the normal operation of all the chutes in discharging a measure of coal into the car will overload it and spill more or less coal. In order to prevent the operation of the loader except where the car passing beneath the chutes is initially empty or substantially so, there is provided a switch responsive to the passage of a car containing a load or a portion of a load, which switch is adapted to open the magnet circuit. Herein such a switch is shown at 197 and is connected by the link 220 to the lever arm 221, the latter fulcrumed at 222 and carrying at its opposite end a support 223 for the split track section 224. The latter consists of a pair of rails constituting a portion of the trackway 2 which is reached by the cable car before passing under the first chute, the rails being jointed at 225 and resting at their ends on the supports 226. These rails are normally supported by the lever-sustained plate 223 which is held in position by the spring 227 pressing down upon the lever 221 near its opposite end. The spring has such a tension that it will not yield under the passage of an empty car over the track section and, under such conditions, the split track section 224 remains substantially rigid. In the case of a loaded or partly loaded car, however, the track section 224 will depress under the weight of the car, lifting the opposite end of the lever against the spring 226 and raising the switch 197 to break the circuit. This in turn deenergizes the magnet 194 and opens the magnet circuit at the switch 188.

The loading system, diagrammatically shown in Fig. 15, and the loading mechanism heretofore described may have application to widely varying conditions, but herein, for the purposes of illustration, there is shown in Figs. 16 and 17 a typical installation embodying the features referred to. The cable road 2 is herein adapted to conduct the cars beneath the storage bin and the several hoppers 1, 1ª and 1ᵇ, which latter are maintained charged from a source not herein shown. The cars are then propelled from the point of charge up the incline shown to an elevated section of the trackway and over the opposite loop section 230 of the trackway, which latter may extend lengthwise a dock or other discharge location, where the material may be automatically or otherwise discharged from successive cars by well known devices, into a vessel or vessels lying alongside the dock, or into conveying devices which convey it to such vessels or into storage receptacles, as the case may be.

While I have herein shown and described for purposes of illustration one specific embodiment of the invention, it is to be understood that the same is not limited to the details of construction or form or relative arrangement of parts or to the specific application herein made of the broad principles of the invention, but that extensive deviations may be made without departing from the spirit thereof.

Claims:

1. In an automatic loading apparatus, the combination with a plurality of hoppers, each having a delivery chamber with a fixed bottom plate and a movable swinging wall for one end, said delivery chamber being adapted to receive material from said hopper by gravity, of a movable delivery plunger for each apparatus adapted to have a delivery movement across the bottom plate to open the closure and force the accumulated material over the edge of the bottom plate and deliver the same directly to a movable conveyance beneath, power-driven means for operating said plunger including a driving shaft with transmission gearing, a constantly driven power supply means, power transmission means to drive said shaft in either direction from the power supply means and including a pair of driving members, one for advance movement of the plunger and the other for reverse movement thereof, means for connecting the power transmission means to the driving shaft to drive the plunger in either direction and including a clutch for each driving member and a pressure fluid, clutch-operating device for each, a controlling valve for controlling the clutch-operating devices to apply the clutch independently, said valve when moved to one position acting to clutch the delivery drive member to the drive shaft and cause the delivery movement of the plunger, and when moved to its opposite position causing the reverse drive member to be clutched to the drive shaft and return the delivery plunger to its initial position, and having means to provide for the release of both clutches when the valve is in an intermediate position, means adapted to be actuated by an approaching conveyance at each loading hopper to move the corresponding valve and start the delivery plunger on its delivery movement, said valve-moving means including a latch and a movable trigger normally tensioned against its latch, said trigger having operative connections to said valve, a tripping mechanism for moving the latch to release the trigger and a knock-off device on the conveyance to move the trip mechanism when the car reaches a position beneath the delivery chamber, means movable with the plunger to reverse the movement thereof at the end of its delivery movement and comprising cam means and cooperating parts to move said trigger back to reverse the valve and connect the drive shaft through the remaining pressure fluid clutch-operating member to the reverse drive member and cam means also carried thereby to move the trigger and valve to its mid or normal position near the close of the reverse movement of the plunger to bring the latter to rest and to further tension the trigger against its latch, thereby restoring the parts to their normal position, a brake for the driving mechanism, said brake being spring-applied and pressure-fluid-released and means to control the brake cooperatively with said clutch members to automatically release the brake when either power-actuated driving member is connected to drive the plunger and apply the brake immediately when said members are disconnected from the plunger, said means including a pressure fluid, controlling valve for controlling the admission of pressure fluid to the brake, said valve being cooperatively controlled by the pressure fluid admitted to the pressure-fluid, clutch-controlling devices.

2. In the loading system, a loading apparatus having a movable delivery member, a power transmission means for applying power to impart to said member a delivery movement and also a movement in its reverse direction, pressure fluid controlling means for said member, a controlling valve for said controlling means, means adapted to be actuated by a travelling conveyance to move the valve to one position and start the delivery member on its delivery movement, said valve-moving means including a latch and a movable trigger normally tensioned against its latch, said trigger having operative connections to said valve, a tripping mechanism for moving the latch to release the trigger and move the valve, a device on the travelling conveyance to move the tripping mechanism, means movable with the delivery member to reverse the movement thereof at the end of its delivery movement and comprising means to move said trigger back to reverse the valve, and means also carried thereby to move the trigger and valve to its mid or normal position near the close of the reverse movement of the delivery member to bring the latter to rest and further tension the trigger against its latch, thereby to restore the parts to their normal position.

3. In a loading apparatus, a reciprocatory movable delivery member and controlling means for controlling the application of power thereto, said means including a latch, a controlling member normally held against tension by said latch and adapted when released thereby to move to a position to initiate the delivery movement of said delivery member, means actuated by the delivery member to move the controlling member reversely and thereby reverse the movement of the delivery member and means effective on the return movement of the delivery member to move said controlling member to its normal position where it is engaged by said latch and also to tension the same to restore it to its normal condition.

4. A loading system having a loading apparatus provided with a movable discharge member for discharging a quantity of material into a moving conveyance while in transit, pressure fluid controlling means therefor, a controlling valve adapted to have a plurality of positions adapted when moved to one position to start the delivery member in motion, means adapted to be actuated by movement of a conveyance for initially moving said valve, means for reversing said valve and reversing the movement of the delivery member when the latter reaches the end of its delivery movement and means for bringing the valve to an intermediate position to stop further movement of the delivery member at the end of the reverse movement.

5. An automatic loading system for travelling conveyors having loading apparatus provided with a receptacle for holding material and a movable discharge member for delivering a quantity of material therefrom to an underlying conveyance, a constantly-actuated power-driven member with power transmission means to operatively connect the same to said discharge member to effect a quick movement thereof, controlling means at the loading apparatus adapted to be actuated by the moving conveyance to be loaded to control said power transmission means to move said discharge member and deliver a quantity of material to said conveyance while in transit beneath the receptacle.

6. An automatic loading system for travelling conveyors having loading apparatus including a receptacle and a power driven, movable discharge member therefor to discharge a quantity of material therefrom to a moving conveyance while the latter is in transit beneath the receptacle and controlling means actuated by said conveyance to apply power to move said member.

7. In an automatic loading system for travelling conveyors, a plurality of loading apparatuses, each having a stationary receptacle and a power-driven, movable discharge member to discharge a quantity of material to the moving conveyance while in transit beneath the receptacle and means for automatically effecting the movement of said discharge member at each apparatus as the conveyance passes beneath the same to deposit quantities of material separately therein as it successively passes the several loading apparatuses.

8. In an automatic loading system for travelling conveyors, the combination with a plurality of loading apparatuses including each a receptacle for the material and a movable discharge member movable within said receptacle and adapted to force a quantity of material directly from said receptacle to the moving conveyance, and means automatically to effect the movement of said discharge member at each apparatus as the conveyance passes the same.

9. An automatic loading system for travelling conveyors having a hopper, a delivery chamber with a discharge opening, a reciprocatory movable delivery plunger having a movement in said delivery chamber to deliver a quantity of material to a travelling conveyance and means automatically to effect the movement of said discharge member as the conveyance passes the same.

10. In a loading system, the combination of a hopper having a delivery chamber with a fixed bottom and an upwardly movable swinging closure for the delivery end, a reciprocatory movable delivery plunger adapted to have a delivery movement across the bottom and relatively to the closure to open the closure and force the accumulated material over the edge thereof, a conveyance beneath the chamber and receiving the material therefrom, and power-driven means for operating the plunger.

11. An automatic loading system having loading apparatus including a receptacle and a power-driven, movable discharge member to discharge a quantity of material to a conveyance while the latter is in transit, a constantly driven, driving member for said discharge member, a clutch for connecting the driving member to the discharge member, a pressure fluid, clutch-operating device to actuate the clutch to effect a quick movement of the driving member, a controlling valve and means adapted to be actuated by a moving conveyance for moving the valve.

12. An automatic loading system having loading apparatus including a power-driven, movable discharge member to discharge a quantity of material to a moving conveyance while in transit, a constantly driven, driving member for said delivery member, means to connect the driving member to and disconnect the same from the discharge member, pressure fluid controlling means therefor, a controlling valve, a trigger the release of which moves the valve, and means carried by the conveyance to release the trigger.

13. An automatic loading system having loading apparatus including a power-driven delivery member to deliver a quantity of material to a moving conveyance, a driving member therefor, power transmission means to drive said driving member in either direction and including a pair of constantly driven, driving members, one for movement of the delivery member in one direction and the other for the reverse movement thereof, a clutch for each driving member, and means adapted to be actuated by a conveyance for controlling said clutches.

14. In an automatic loading system, the combination of a loading apparatus including a power-driven, movable delivery member which moves the material, power transmission means adapted to start, stop and reverse the movement thereof to cause the same to move a body of the material and to return to its initial position in readiness to move another body, and means adapted to be actuated by a moving conveyance for automatically controlling said power transmission means.

15. In an automatic loading system, the combination of a loading apparatus having a power-driven, movable propelling delivery member to forcibly move a quantity of material toward a point of delivery to a moving conveyance while in transit, power transmission means adapted to start, stop and reverse the movement of the delivery member, pressure fluid controlling means therefor, a controlling valve and means automatically to move said valve through the movement of the conveyance.

16. In an automatic loading system, the combination of a loading apparatus having a power-driven, movable discharging member to discharge a quantity of material to a moving conveyance while in transit, a constantly driven, power transmission means adapted to start and stop the movement of the delivery member, pressure fluid controlling means, a controlling valve, a trigger to move the valve and means automatically to actuate the trigger through the movement of the conveyance.

17. A loading system having a loading apparatus provided with a movable discharge propulsion member for forcibly propelling a quantity of material toward a point of delivery whence it is delivered into a moving conveyance while in transit, pressure fluid controlling means therefor, a controlling valve adapted when moved to one position to start the delivery member and means for moving said valve actuated through the movement of the conveyance.

18. In a loading system, the combination of a loading apparatus having a movable delivery member which propels the material, power-driven means for moving said member to cause the same to propel the material, means for applying said power-driven means to effect a quick movement of said delivery member, pressure fluid controlling means, a valve, a valve actuator, and means for moving the valve actuator through the movement of a conveyance.

19. In a loading system, the combination with a loading apparatus having a movable delivery member which propels the material, a power driving member, a controlling valve with a cooperating pressure fluid controlling means to control the application of power to said delivery member to cause the same to propel the material, means automatically to move the valve to start said delivery member in motion, and means automatically to bring said delivery member to rest when its movement is completed.

20. In a loading apparatus for loading a moving conveyance, the combination with a delivery chamber, a power-driven discharge member, a tensioned controlling member to apply power to said discharge member and means automatically to release said controlling member through the approach of a conveyance.

21. In a loading apparatus for loading a moving conveyance, the combination with a delivery chamber, a power-driven discharge member, a tensioned controlling member to apply power to said discharge member, means automatically to release said controlling member through the approach of a conveyance, and means to restore the tensioned controlling member to its normal position under tension when the discharge member has completed its movement.

22. In an automatic loading apparatus, the combination with a power-driven delivery member, pressure fluid controlled means for controlling the application of power to said member and a cooperating pressure-controlled brake also to govern the movement of said delivery member.

23. In a loading apparatus, a movable discharge member, driving means therefor, a brake, a pressure fluid controlling device to control the application of power to said member and valve means coordinately controlling the pressure fluid controlled means and said brake.

24. In an automatic loading system, the combination with a loading apparatus of a movable delivery member for forcibly propelling material toward a point of delivery to a conveyance in transit, pressure fluid means for applying power to move said delivery member to cause the same to move the material, a valve, and means adapted to be actuated by the approach of a conveyance for moving said valve.

25. In a loading system, the combination with a loading apparatus having a movable delivery member, for propelling the material, means for applying power to move said member to cause the same to move the material and means actuated by the movement of the conveyance for controlling said power-applying means.

26. In an automatic loading apparatus for loading travelling conveyors while in transit, the combination with a delivery hopper, a power-driven delivery member adapted by a quick movement to forcibly propel a quantity of material into a conveyor while the latter is in transit, pressure fluid means to actuate said member to cause the same to move the material and a valve adapted to be actuated by an approaching conveyor to initiate the movement of said member.

27. In an automatic loading apparatus for loading travelling conveyors while in transit, the combination with a delivery hopper, a power-driven delivery member adapted by a quick movement to discharge a quantity of material into a conveyor while the latter is in transit, pressure fluid means to actuate said member, a valve to initiate the movement of said member, a valve actuator normally restrained against movement and means adapted to release said actuator, said means being adapted to be engaged by an approaching conveyor.

28. In an automatic loading apparatus for loading travelling conveyors while in transit, the combination with a delivery hopper, a power-driven delivery member adapted by a quick movement to discharge a quantity of material into a conveyor while the latter is in transit, a constantly driven, driving member, fluid pressure means to operatively connect said driving member to said delivery member, and means adapted to be actuated by an approaching conveyor to control said pressure fluid means.

29. In an automatic loading system, a loading apparatus, means actuated by a moving conveyance for delivering measured charges of material to successive conveyances, and means for rendering said delivery means ineffective on the approach of a conveyance already containing a load.

30. In an automatic loading system having a trackway, a loading apparatus, means actuated by a conveynce moving upon said trackway for delivering a quantity of material thereto, means for rendering said delivery means ineffective, a device for controlling said last-named means associated with said trackway and movable upon the passage of a conveyance exceeding a predetermined weight.

31. In an automatic loading system, a loading apparatus, tripping mechanism to control the movement of the loading apparatus, said tripping mechanism being adapted to be actuated by a moving conveyance to be loaded, electro-magnetic means to render said tripping mechanism ineffective and a switch to control said electro-magnetic means responsive to the passage of a conveyance exceeding a predetermined weight.

32. In an automatic loading system, the combination with a plurality of loading devices of means at each device to be actuated by a moving conveyance for depositing each a quantity of material in said conveyance while the latter is in transit and means for rendering said loading devices ineffective on the approach of a conveyance exceeding a predetermined weight.

33. In an automatic loading system, a loading apparatus, means actuated by a moving conveyance for delivering a quantity of material thereto while said conveyance is in transit and means to prevent the delivery of material to a conveyance already loaded.

34. In an automatic loading system, the combination with loading apparatus of a moving conveyance, motive means for moving the same, means actuated by said conveyance for causing said loading apparatus to deliver a quantity of material to said conveyance and means responsive to a change in speed of said motive means for rendering said loading means ineffective.

35. In an automatic loading system, the combination of a loading apparatus, a moving conveyance, means actuated by said conveyance for causing said loading apparatus to deliver a quantity of material to said conveyance while in transit, motive means to impart a travelling movement to said conveyance and means to render said loading apparatus ineffective when the speed of said motive means falls below a predetermined amount.

36. In an automatic loading system, the combination with loading apparatus, a cable road with cable cars thereon, motive means for propelling the cars, a speed responsive device connected thereto, means adapted to be actuated by the passage of a cable car to actuate said loading apparatus and deliver a quantity of material thereto while said car is in transit, an electro-magnetic device to render said actuating means effective or ineffective and a switch actuated by said speed responsive means for controlling said electro-magnetic device.

37. In an automatic loading system, the combination with a loading apparatus, a movable member for delivering a quantity of material therefrom, a power-driven member, pressure fluid means adapted to apply power to said member to move the same, means adapted to be actuated by the passage of a moving conveyance for controlling said pressure fluid means and causing the delivery of a quantity of material to said conveyance while in transit, and means for rendering said controlling means ineffective when the pressure fluid supply falls below a predetermined amount.

38. In a loading system, the combination with a loading apparatus, pressure fluid controlled means adapted to be actuated by a conveyance for causing said loading apparatus to deposit a quantity of material in said conveyance and means responsive to variations in the fluid pressure supply at said fluid pressure controlled means for rendering said loading apparatus ineffective.

39. In an automatic loading system, the combination with a loading apparatus, a movable member having a reciprocatory movement for delivering material therefrom, a constantly driven prime mover, pressure fluid controlled means for connecting said prime mover to move said member in one direction and thereafter to connect said prime mover to move said member in the opposite direction, means actuated by a moving conveyance for controlling said pressure fluid means to cause the delivery of a quantity of material to said conveyance while in transit, an electro-magnetic device responsive to a drop in pressure at said pressure fluid means for rendering said last named controlling means and said loading apparatus ineffective.

40. In an automatic loading system, the combination with a plurality of loading devices, controlling means at each device adapted to be actuated by a moving conveyance for delivering a quantity of material to said conveyance, an electro-magnetic device at each controlling means for rendering the same ineffective and preventing the operation of the loading apparatus, and a switch at each loading apparatus accessible to the attendant for controlling said electro-magnetic means.

41. In an automatic loading system, the combination with a loading apparatus of controlling means adapted to be actuated by a moving conveyance for delivering a quantity of material to said conveyance while in transit, an electro-magnetic device for rendering said controlling means ineffective and a switch for controlling said electro-magnetic device.

42. In an automatic loading system, the combination with a loading apparatus, a controlling means adapted to be actuated by a moving conveyance for delivering a quantity of material to said conveyance while in transit, and means under the control of an attendant for rendering said controlling means ineffective at will.

43. In an automatic loading system, the combination with a plurality of loading devices, of controlling means at each device adapted to be actuated by a moving conveyance for delivering each a quantity of material to said conveyance while in transit, and means within the control of an attendant for simultaneously rendering all of said controlling means ineffective.

44. In an automatic loading system, the combination with a plurality of loading devices, of controlling means at each device adapted to be actuated by a moving conveyance for causing the deposit of a predetermined quantity of material in said conveyance, an electro-magnetic device for each controlling means adapted when energized to render the same effective and when de-energized to render the same ineffective, a circuit including said devices and a source of current, a magnet-controlled switch for closing said circuit and a switch for controlling said magnet.

45. In an automatic loading system, the combination with a loading device, of controlling means adapted to be actuated by a moving conveyance for causing the delivery of a quantity of material to said conveyance while in transit, means initially rendering said controlling means ineffective and a starting device for controlling said last-named means to render said controlling means effective.

46. In a loading system, the combination of a hopper having a delivery chamber with a bottom, a movable closure for the delivery chamber, a reciprocatory delivery plunger having a movement across the bottom relatively to the closure to force accumulated material over the edge thereof into a conveyance below, power driven means for operating the plunger, and an operative connection between the plunger and the closure to cause the former to open the latter when the plunger executes its delivery movement.

47. In an automatic loading system for traveling conveyances having loading apparatus including a receptacle and a power driven movable discharge member therefor to discharge a quantity of material therefrom into a moving conveyance while the latter is in transit beneath the receptacle, controlling means actuated by said conveyance to apply power and initiate the movement of said member, and means controlled by the movement thereof to stop and reverse the movement of the discharge member and to restore it to its initial position.

48. In an automatic loading system for traveling conveyances having a loading apparatus including a receptacle and a power driven movable discharge member therefor to discharge a quantity of material therefrom to a moving conveyance while the latter is in transit beneath the receptacle, a controlling device to control the power for moving said member, means actuated by said conveyance to move said controlling member to initiate the movement of the discharge member, and means for moving said controlling member dependent on subsequent movement of said discharge member to control further movement thereof.

49. In an automatic loading system for traveling conveyances having loading apparatus including a receptacle and a power driven movable discharge member therefor to discharge a quantity of material therefrom to a moving conveyance while the latter is in transit beneath the receptacle, a controlling member normally restrained against movement for controlling the actuation of power to move the delivery member, and means dependent on the approach of the conveyance to release said actuator.

50. In an automatic loading system, a loading apparatus having a power driven movable discharge member to discharge a quantity of material to a moving conveyance while the latter is in transit beneath the same, a controlling device with means for causing movement of the same on the approach of the conveyance to apply power to move said member, and means to reverse and move said controlling device through subsequent movement of said delivery member.

In testimony whereof, I have signed my name to this specification.

ALMON E. NORRIS.